April 22, 1924.

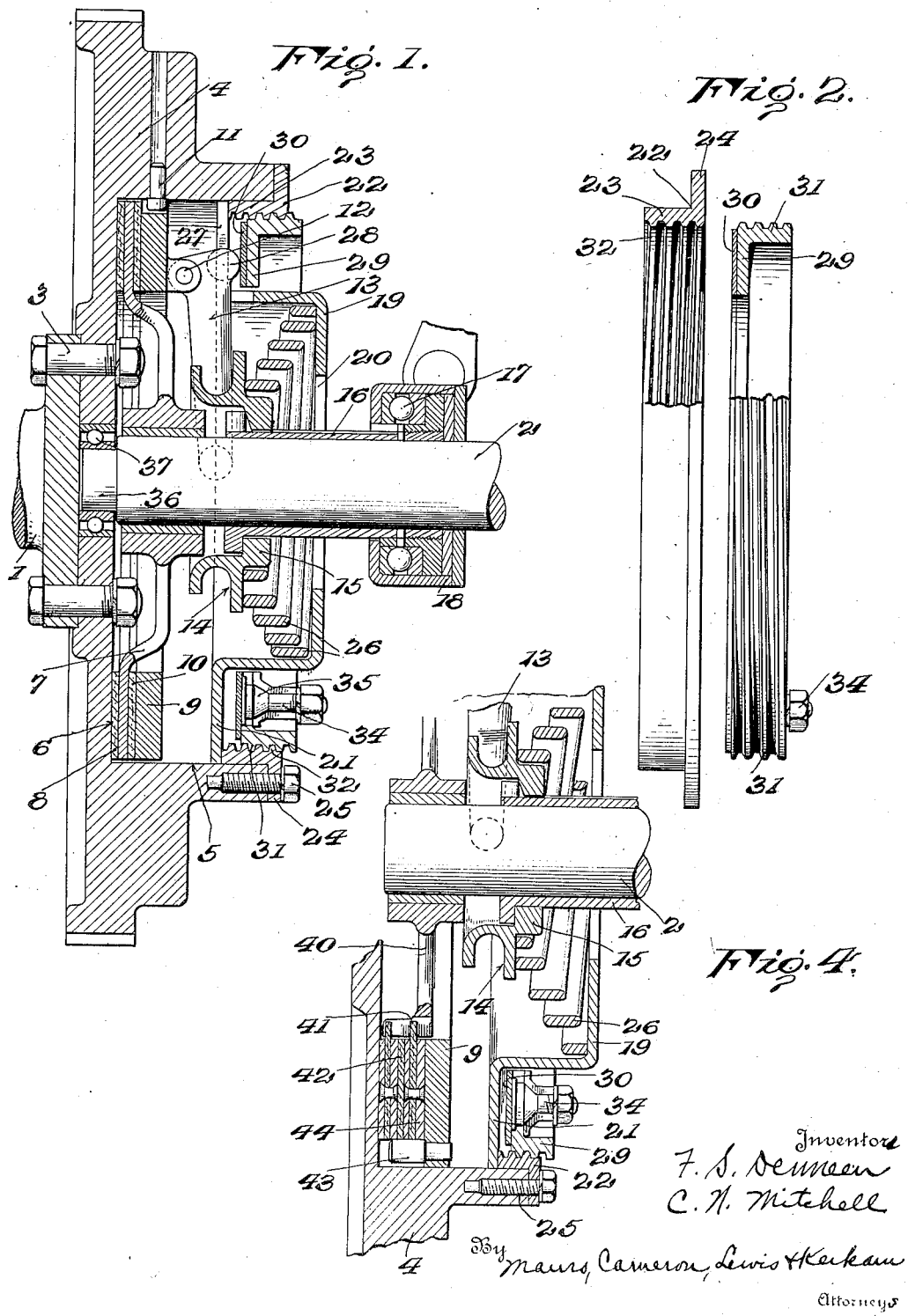

F. S. DENNEEN ET AL 1,490,967

CLUTCH

Filed Oct. 18, 1920.

Inventors
F. S. Denneen
C. N. Mitchell

By Mauro, Cameron, Lewis & Kirkan
Attorneys

Patented Apr. 22, 1924.

1,490,967

UNITED STATES PATENT OFFICE.

FRANCIS S. DENNEEN AND COURTNEY N. MITCHELL, OF CLEVELAND, OHIO.

CLUTCH.

Application filed October 18, 1920. Serial No. 417,752.

*To all whom it may concern:*

Be it known that we, FRANCIS S. DENNEEN and COURTNEY N. MITCHELL, citizens of the United States, and residents of Cleveland, Ohio, have invented new and useful Improvements in Clutches which invention is fully set forth in the following specification.

This invention relates to clutches and, while capable of use in a wide variety of clutches, has particular utility when embodied in clutches for motor cars and similar uses.

It has heretofore been proposed to move the members of a friction clutch axially of the driving and driven elements by a pressure ring with which cooperates a plurality of levers. It has also been proposed to mount these levers pivotally on said pressure ring and cause the same to fulcrum on a second ring which may be adjusted axially to take up the wear of the cooperating clutch members, said adjustment being effected by contacting cam faces or by the relative movement of threaded parts. It is an object of this invention to provide a clutch of this general type but of improved construction.

A further object of the invention is to provide a clutch of the type characterized which is made up of simple parts whereby inexpensive forgings and stampings may be used and intricate and expensive castings and forgings avoided, and one which does not necessitate expensive machining and highly skilled labor when constructing and assembling the same.

A further object of this invention is to provide a clutch of the type characterized which may be easily adjusted to take up the wear of the cooperating clutch members and which may be readily inspected and repaired.

Another object of this invention is to provide a simplified clutch of the type characterized which is composed of a minimum number of parts and is light in weight and yet which is strong and durable.

Other objects will appear as the description of the invention proceeds.

The invention is capable of receiving a variety of mechanical expressions, two of which are shown on the accompanying drawings, but it is to be expressly understood that the drawings are for purposes of illustration only and are not to be construed as a definition of the limits of the invention, reference being had to the appended claims for that purpose.

In said drawings:—

Fig. 1 is an axial section of a clutch embodying the present invention.

Fig. 2 is a partially sectional view of the fulcrum ring and cover-retaining ring in separated relationship.

Fig. 4 is a partial axial section of a multiple disk clutch embodying the present invention.

Figure 3:
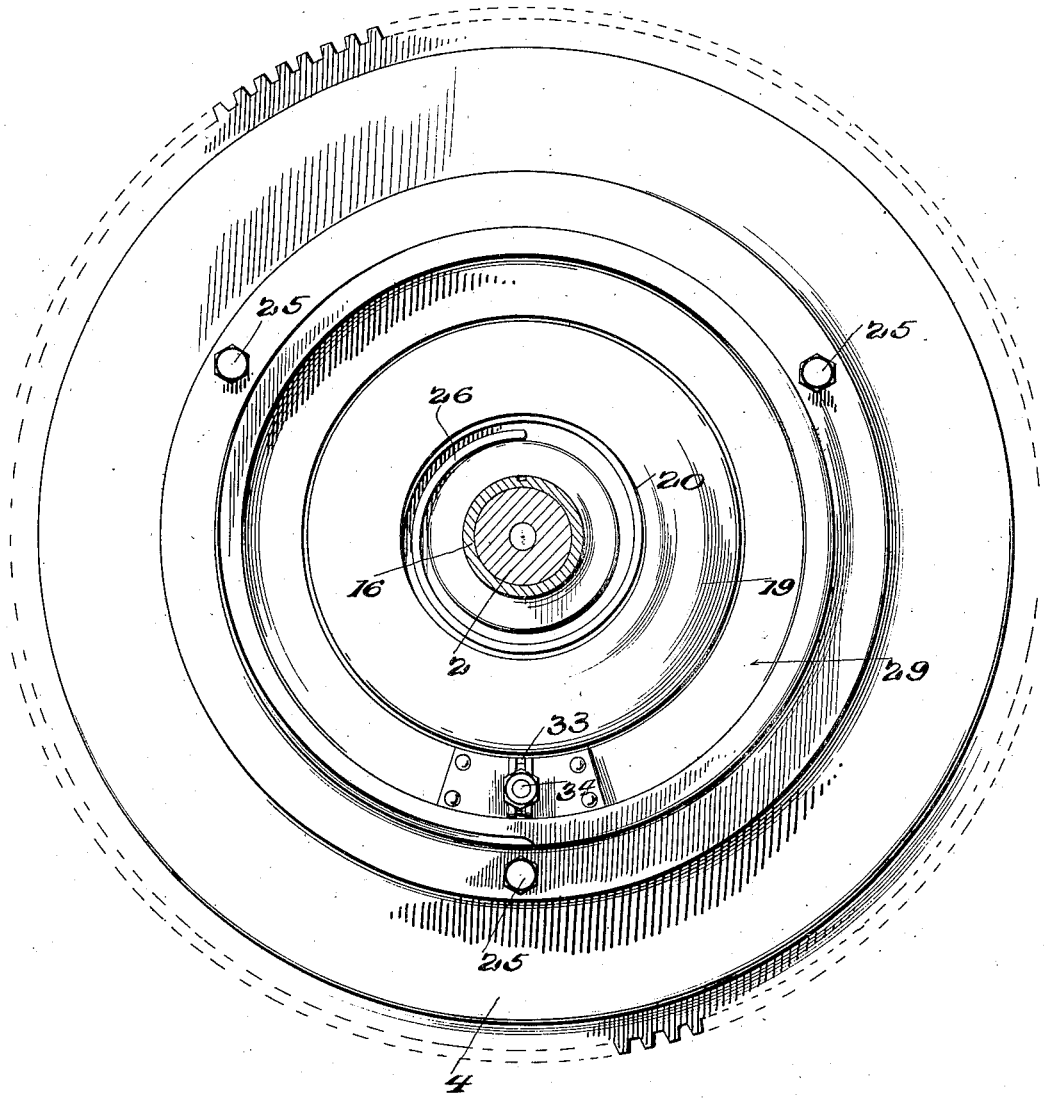
Fig. 3 is a face view of the clutch.

In the form shown in Figs. 1, 2 and 3, 1 is the driving element and 2 the driven element. Suitably attached to a flange on the driving element or shaft 1, as by a plurality of bolts 3, is a clutch member 4 which, when the clutch is used on a motor car, may be the usual fly wheel on the engine shaft. In the form shown, the fly wheel 4 is cored axially to form a housing and provide the recess 5, the rear face 6 of which constitutes one of the friction surfaces of the clutch, although if desired a separate ring may be mounted within said recess.

Suitably keyed or otherwise fixed to the driven element or shaft 2 within said recess 5 is a cooperating clutch member 7 between which and the friction surface 6 a ring of any suitable friction material 8 may be interposed. Also mounted within said recess 5 is a pressure ring 9 between which and the clutch member 7, a second friction ring 10, similar to ring 8, may be interposed. The pressure ring 9 is keyed to rotate with the housing or fly wheel 4 in any suitable way. In the form shown, one or more slots are provided in the periphery of said ring and headed pins 11 are mounted in suitable apertures in the wall of the fly wheel or housing with their heads in engagement with said slots.

Pivotally mounted on said pressure ring 9, as by lugs 12, are a plurality of clutch operating levers 13. Any suitable number of levers may be employed, three being preferred positioned 120° apart. Said levers extend inwardly tangentially of the shaft 2 and their inner ends are operatively engaged in the groove 14 of a lever-shifting collar 15 keyed or otherwise suitably connected to a clutch-shifting sleeve 16. At its opposite end, said sleeve 16 has a ball bearing 17 with a clutch-shifting yoke 18 of any suitable construction. Said levers may carry rollers for engagement in said groove 14, if desired.

A cover or housing for the clutch members is preferably provided, and when the clutch members are housed in a recess in the fly wheel as heretofore described, said housing may be more or less completed by a detachable closure member at the open end of the housing. The term "cover" is used in the claims, however, as generic to any suitable covering, casing or housing for the clutch members whether or not the clutch members are more or less housed in a recess in the fly-wheel. The closure member, in the form illustrated, takes the form of a cupped member 19 having a large central aperture 20 and a peripheral flange 21. Said closure member may be retained in position in any suitable way, preferably by a ring 22 having an axial flange 23 which fits the bore of the recess 5 and a radial flange 24 which may be suitably secured to the peripheral edge of the fly wheel 4 as by a plurality of tap screws 25. The cupped portion of said closure member 19 forms a housing for a coil spring 26 which at its outer end engages the inner wall of said closure member and at its inner end engages a flange on the clutch-shifting collar 15. Said spring serves both to normally urge the levers 13 towards clutch-applying position and to retain said closure member 19 in engagement with the ring 22 to prevent rattling of the parts.

The flange 21 of said closure member 19 is slotted, as shown at 27, opposite each of the levers 13 and the fulcrum portions 28 of said levers project through said slots 27 into engagement with a fulcrum ring 29 mounted exteriorly of said closure member. The fulcrum portions of said levers may also carry rollers for engagement with said ring 29. Said ring 29 may be provided with a renewable face ring 30 of wear-resisting material for engagement with the fulcra of said levers. To provide for adjustment of said fulcrum ring 29 so as to take up the wear of the clutch parts, said ring is made axially adjustable and to this end is preferably provided with exterior threads 31 which cooperate with interior threads 32 on the cover-retaining ring 22. Any suitable means may be provided for locking said fulcrum ring 29 in adjusted position. In its preferred construction said ring is split as shown at 33 and an expanding bolt 34 is suitably mounted thereon so that by drawing its tapered head 35 into firm engagement with the sides of the kerf in said ring said ring may be expanded into snug interlocking engagement with the ring 22.

If desired, the driven shaft 2 may be provided with an extension 36 which has a ball guide bearing 37 in the wall of the housing or fly wheel 4.

In operation, the driving element or shaft 1 rotates the housing or fly wheel 4, the pressure ring 9, owing to the pins 11, the levers 13, collar 15 and sleeve 16, as well as the closure member 19, fulcrum ring 29 and their associated parts, rotating therewith. Normally, spring 26 holds collar 15 and levers 13 in the position shown in Fig. 1. Since these levers fulcrum on the ring 29, the pressure exerted by spring 26 on said levers is transmitted to pressure ring 9 which forces clutch member 7 with the cooperating friction rings 8 and 10 into clutching engagement with the face 6 of the housing or flywheel 4, whereby the element or shaft 2 is driven from the element or shaft 1. In order to disengage the clutch to prevent rotation of shaft 2 while flywheel 4 rotates, sleeve 16 is shifted toward the right, as viewed in Fig. 1, by any suitable means, as a foot-pedal, not shown. As the clutch parts wear, the expanding bolt 34 may be loosened to release the ring 29, whereupon said ring may be screwed inwardly sufficiently to take up the wear, after which said bolt may be operated to expand the ring 29 into locking engagement with the ring 22.

In the above described embodiment of the invention a single friction disk has been mounted on the driven shaft. The invention, however, is equally applicable to multiple disk clutches, as is shown in the embodiment of Fig. 4, wherein similar parts are given the same reference characters as in the embodiment of Figs. 1 to 3. In this arrangement, the clutch member 40 mounted on the driven shaft 2 carries a plurality of annular friction rings 41 which cooperate with one or more annular friction rings 42 mounted to rotate with the housing or fly wheel 4. While said ring or rings 42 may be keyed directly to the fly wheel, the form shown has said ring or rings 42 keyed to the pressure ring 9 by the use of a pin 43 mounted in said ring and extending into a slot or aperture in the friction rings 42. As in the embodiment of Figs. 1 to 3, suitable rings of frictional material 44 are interposed between each of said rings 41 and 42 as well as between said rings and the clutch surfaces of the pressure ring 9 and the housing or fly wheel 4.

It will therefore be perceived that a clutch has been provided which is composed of a minimum number of simple parts whereby expensive or complicated castings or forgings are avoided and whereby simple forgings and stampings may be employed without the use of highly skilled labor or expensive machining. While said clutch is light and simple in construction it is strong and durable and possesses the advantages that it is readily assembled, inspected and adjusted.

While the embodiments illustrated have been described with considerable particularity, it is to be expressly understood that the invention is not limited thereto as changes may be made in form, arrangement and details of construction, and certain features thereof used without other features thereof, without departing from the spirit of this invention. Reference is therefore to be had to the claims hereto appended for a definition of the limits of the invention.

What we claim is:

1. In a clutch, in combination with driving and driven elements and cooperating clutch members operatively connected to said driving and driven elements, clutch actuating means comprising a plurality of levers for actuating said clutch members, a spring for actuating said levers, a member constituting an abutment for said spring and through which said levers project, an adjustable member on which said levers fulcrum, and means for locking said last-named member in adjusted position.

2. In a clutch, in combination with driving and driven elements and cooperating clutch members operatively connected to said driving and driven elements, clutch actuating means comprising a plurality of levers for actuating said clutch members, a housing member through which the fulcrum portions of said levers project, a ring on which said levers fulcrum, a member with which said ring has threaded engagement for purposes of adjustment, and means for locking said ring in adjusted position.

3. In a clutch, in combination with driving and driven elements and cooperating clutch members operatively connected to said driving and driven elements, clutch actuating means comprising a plurality of levers for actuating said clutch members, a housing member through which the fulcrum portions of said levers project, a split ring on which said levers fulcrum, a member with which said ring has threaded engagement for purposes of adjustment, and an expanding bolt for locking said ring in adjusted position.

4. In a clutch, in combination with driving and driven elements and cooperating clutch members operatively connected to said driving and driven elements, clutch actuating means comprising a plurality of levers for actuating said clutch members, a cover for said clutch members through which the fulcrum portions of said levers project, and means exterior of said cover on which said levers fulcrum.

5. In a clutch, in combination with driving and driven elements and cooperating clutch members operatively connected to said driving and driven elements, clutch actuating means comprising a plurality of levers for actuating said clutch members, a cover for said clutch members through which the fulcrum portions of said levers project, and an adjustable member exterior of said cover on which said levers fulcrum.

6. In a clutch, in combination with driving and driven elements and cooperating clutch members operatively connected to said driving and driven elements, clutch actuating means comprising a plurality of levers for actuating said clutch members, a housing for said clutch members, a closure member for said housing through which the fulcrum portions of said levers project, screw threads on said housing exterior of said closure member, and a ring in threaded engagement with said screw threads and on which said levers fulcrum.

7. In a clutch, in combination with driving and driven elements and cooperating clutch members operatively connected to said driving and driven elements, clutch actuating means comprising a plurality of levers for actuating said clutch members, a housing for said clutch members, a closure member for said housing through which the fulcrum portions of said levers project, a ring fixed to said housing for retaining said closure member in position, and an adjustable ring coacting with said last-mentioned ring and on which said levers fulcrum.

8. In a clutch, in combination with driving and driven elements and cooperating clutch members operatively connected to said driving and driven elements, clutch actuating means comprising a plurality of levers for actuating said clutch members, a cover for said clutch members through which the said levers project, an adjustable member exterior of said cover on which said levers fulcrum, and means for locking said member in adjusted position.

9. In a clutch, in combination with driving and driven elements and cooperating clutch members operatively connected to said driving and driven elements, clutch actuating means comprising a plurality of levers for actuating said clutch members, a cover for said clutch members through which the fulcrum portions of said levers project, an adjustable ring exterior of said cover on which said levers fulcrum, and an expanding device for locking said ring in adjusted position.

10. In a clutch, in combination with driving and driven elements and cooperating clutch members operatively connected to said driving and driven elements, clutch actuating means comprising a plurality of levers for actuating said clutch members, a housing for said clutch members, a closure member for said housing through which the fulcrum portions of said levers project, a threaded ring having engagement with threads carried by said housing and on which ring said levers fulcrum, and means for locking said ring in adjusted position.

11. In a clutch, in combination with driving and driven elements and cooperating clutch members, clutch actuating means comprising a plurality of levers for actuating said clutch members, a spring for actuating said levers, a member constituting an abutment for said spring and through which said levers project, and a member exterior of said abutment member on which said levers fulcrum.

12. In a clutch, in combination with driving and driven elements and cooperating clutch members operatively related to said driving and driven elements, a member movable axially of said clutch members for actuating the same, a pluralitiy of levers carried by said member for moving the same, a cover through which said levers project, and means exterior of said cover on which said levers fulcrum.

13. In a clutch, in combination with driving and driven elements and cooperating clutch members operatively related to said driving and driven elements, a member movable axially of said clutch members for actuating the same, a plurality of levers carried by said member for moving the same, a cover through which said levers project, and an adjustable member exterior of said cover on which said levers fulcrum.

14. In a clutch, in combination with driving and driven elements and cooperating clutch members operatively related to said driving and driven elements, a member movable axially of said clutch members for actuating the same, a plurality of levers carried by said member for moving the same, a cover through which said levers project, an adjustable member exterior of said cover on which said levers fulcrum, and means for locking said member in adjusted position.

15. In a clutch, in combination with driving and driven elements and cooperating clutch members operatively related to said driving and driven elements, a housing for said clutch members, a member movable longitudinally of said housing for actuating said clutch members, a plurality of levers carried by said member for moving the same, a closure member through which said levers project, a ring exterior of said closure member having threaded engagement with threads carried by said housing and on which ring said levers fulcrum, and means for locking said ring in adjusted position.

16. In a clutch, in combination with driving and driven elements and cooperating clutch members operatively related to said driving and driven elements, a housing for said clutch members, a member movable longitudinally of said housing for actuating said clutch members, a plurality of levers carried by said member for moving the same, a closure member for said housing through which said levers project, a split ring exterior of said closure member having threaded engagement with threads carried by said housing and on which ring said levers fulcrum, and an expanding device for locking said ring in adjusted position.

17. In a clutch, in combination with driving and driven elements and cooperating clutch members operatively connected to said driving and driven elements, clutch actuating means comprising a plurality of levers for actuating said clutch members, a cover through which said levers project, a ring for retaining said cover in position, and a ring having adjustable connection to said first-named ring and on which said levers fulcrum.

18. In a clutch, in combination with driving and driven elements and cooperating clutch members operatively connected to said driving and driven elements, a plurality of pivotally-mounted levers operable to cause frictional engagement between said clutch members, a member through which the fulcrum surfaces of said levers project, fulcrum surfaces directly engaged by said fulcrum surfaces on said levers exterior of said member, and unitary means for adjusting said fulcrum surfaces.

19. In a clutch, in combination with driving and driven elements and cooperating clutch members operatively connected to said driving and driven elements, a plurality of pivotally-mounted levers operable to cause frictional engagement between said clutch members, a member through which said levers project, adjustable surfaces on which said levers directly fulcrum exterior of said member, and means for simultaneously adjusting said fulcrum surfaces.

20. In a clutch, in combination with driving and driven elements and cooperating clutch members operatively connected to said driving and driven elements, a plurality of pivotally-mounted levers operable to cause frictional engagement between said clutch members, a member through which the fulcrum surfaces of said levers project, and means exterior of said cover providing fulcrum surfaces directly engaged by the fulcrum surfaces of said levers and operable to simultaneously adjust said levers.

21. In a clutch, in combination with driving and driven elements and cooperating clutch members operatively connected to said driving and driven elements, a plurality of pivotally-mounted levers operable to cause frictional engagement between said clutch members, a member through which said levers project, and a member exterior of said last-named member providing fulcrum surfaces directly engaged by said levers and operable to adjust said levers substantially the same amount.

22. In a clutch, in combination with driving and driven elements and cooperating clutch members operatively connected to said driving and driven elements, a plurality of pivotally-mounted levers operable to cause frictional engagement between said clutch members, a member through which the fulcrum surfaces of said levers project, and a rotatable ring exterior of said member providing fulcrum surfaces directly engaged by said levers and operable to adjust said levers simultaneously by substantially equal amounts.

23. In a clutch, in combination with driving and driven elements and cooperating clutch members operatively connected to said driving and driven elements, a plurality of pivotally-mounted levers operable to cause frictional engagement between said clutch members, a member through which said levers project, a member exterior of said last-named member providing fulcrum surfaces directly engaged by said levers and operable to adjust said levers simultaneously, and means to lock said member in adjusted position.

24. In a clutch, in combination with driving and driven elements and cooperating clutch members operatively connected to said driving and driven elements, a plurality of pivotally-mounted levers operable to cause frictional engagement between said clutch members, a member through which said levers project, and an adjustable ring exterior of said member and directly engaged by said levers for adjusting the surfaces on which said levers fulcrum.

25. A frictional clutch, said clutch comprising a casing provided with apertures, a driving and a driven element, thrust mechanism operative for holding said elements in frictional engagement, said thrust mechanism including spaced angularly shaped levers, the clutch being entirely housed in the casing, one arm of said levers projecting through the apertures in the casing and beyond the outer face thereof, and means mounted on the outer side of the casing and adjustable longitudinally of the clutch and constituting a fulcrum point for said projecting arms of the levers.

26. A friction clutch, said clutch comprising a casing provided with apertures, said clutch being entirely housed in said casing, a driving and a driven element, angularly shaped levers disposed within the clutch casing, arms of said levers extending outwardly through the apertures in the casing, and an adjusting ring carried by the housing and cooperating with the outer ends of the arms of the levers.

27. A friction clutch, said clutch comprising a casing provided with apertures, said clutch being entirely housed in said casing, a driving and a driven element, angularly shaped levers for controlling said driving and driven elements, an adjusting ring disposed outside of the housing, outwardly extending arms carried by the angularly shaped levers and extending through the apertures in the housing and cooperating with the adjusting ring.

28. A friction clutch, said clutch comprising a casing provided with apertures, said clutch being entirely housed in the casing, angularly shaped levers for operating the clutch, a projection extending outwardly from one side of the casing, an annular member threaded on said projection and adjustable inwardly and outwardly thereon, one of the arms of said angularly shaped levers extending through the apertures in the casing and cooperating with the annular member threaded on the projection of the casing.

29. A friction clutch, said clutch comprising a casing provided with apertures, said clutch being entirely housed in the casing, angularly shaped levers for operating the clutch, one arm of each of said angularly shaped levers extending outwardly through the apertures in one side of the casing, an adjusting ring carried by said casing and disposed entirely outside thereof, and cooperating with the ends of the outwardly extending arms of the levers.

30. A friction clutch, said clutch comprising a casing provided with apertures, said clutch being entirely housed in the casing, angularly shaped levers for operating the clutch, said levers extending outwardly through the apertures in the housing, an adjusting ring threaded on a portion of said housing and disposed outside of the housing and cooperating with the levers which extend outwardly through the apertures in the casing, and means for holding the adjusting ring in various adjusted positions.

31. In a clutch, in combination with driving and driven elements and cooperating clutch members, a member movable axially of said clutch members for actuating the same, a spring for moving said member, a plurality of levers carried by said member, a member constituting an abutment for said spring and through which said levers project, and means exterior of said abutment member on which said levers fulcrum.

32. In a clutch, in combination with driving and driven elements and cooperating clutch members, a member movable axially of said clutch members for actuating the same, a spring for moving said member, a plurality of levers carried by said member, a member constituting an abutment for said spring and through which said levers project, and an adjustable ring exterior of said abutment member on which said levers fulcrum.

In testimony whereof we have signed this specification.

FRANCIS S. DENNEEN.
COURTNEY N. MITCHELL.